United States Patent [19]

Miyazawa

[11] Patent Number: 5,493,549
[45] Date of Patent: Feb. 20, 1996

[54] OPTICAL RECORDING REGENERATION APPARATUS WITH COMPENSATION CIRCUIT

[75] Inventor: Takao Miyazawa, Suwa, Japan

[73] Assignee: Seiko Epson Corporation, Tokyo, Japan

[21] Appl. No.: 343,270

[22] Filed: Nov. 22, 1994

Related U.S. Application Data

[63] Continuation of Ser. No. 75,841, Jun. 10, 1993, abandoned, which is a continuation of Ser. No. 684,427, Apr. 10, 1991, abandoned.

[30] Foreign Application Priority Data

Apr. 10, 1990 [JP] Japan ................................. 2-94621

[51] Int. Cl.[6] ................................................ G11B 7/125
[52] U.S. Cl. ................... 369/54; 369/116; 369/58
[58] Field of Search ......................... 369/116, 48, 54, 369/13, 111, 59, 58, 47; 360/114; 346/76 L

[56] References Cited

U.S. PATENT DOCUMENTS

| | | | |
|---|---|---|---|
| 4,283,785 | 8/1981 | Miyauchi et al. | 369/116 |
| 4,380,015 | 4/1983 | Ito et al. | 369/116 |
| 4,631,713 | 12/1986 | Romeas et al. | 369/54 |
| 4,788,674 | 10/1988 | Maeda et al. | 369/54 |
| 4,866,692 | 9/1989 | Saito et al. | 369/48 |
| 4,979,162 | 12/1990 | Kimoto et al. | 369/116 |
| 5,050,156 | 9/1991 | Barton | 369/54 |
| 5,070,495 | 12/1991 | Bletscher, Jr. et al. | 369/54 X |
| 5,216,660 | 6/1993 | Iimura | 369/116 |

FOREIGN PATENT DOCUMENTS

| | | |
|---|---|---|
| 0028111 | 5/1981 | European Pat. Off. . |
| 0044072 | 1/1982 | European Pat. Off. . |
| 0126682 | 11/1984 | European Pat. Off. . |
| 0289004 | 11/1988 | European Pat. Off. . |
| 0404251 | 12/1990 | European Pat. Off. . |
| 0100245 | 6/1983 | Japan ............................. 369/116 |
| 0296529 | 12/1986 | Japan ............................. 369/116 |

Primary Examiner—W. R. Young
Assistant Examiner—Thang V. Tran
Attorney, Agent, or Firm—Harold T. Tsiang

[57] ABSTRACT

An optical recording regeneration apparatus with a compensation circuit is provided. In the apparatus, a recording state detection circuit detects the recording state of recorded data and generates state data indicative of the recording state. A modulation control circuit compares the state data with a specified value and generates the comparison results. A drive circuit adjusts the power level and/or the pulse width of the laser beam in accordance with the comparison results. Thus, the power level and/or the pulse width of the laser beam can maintain at an optimum value without being affected by variations in disk recording sensitivity resulting from temperature or other changes over time.

28 Claims, 12 Drawing Sheets

OPTICAL RECORDING REGENERATION APPARATUS WITH COMPENSATION CIRCUIT

This is a continuation of application Ser. No. 08/075,841 filed Jun. 10, 1993, which is a continuation of application Ser. No. 07/684,427, filed Apr. 10, 1991, both now abandoned.

BACKGROUND OF THE INVENTION

The present invention relates to optical recording regeneration apparatus and, in particular, to control means for modulation of a optical source at the time of information recording in such apparatus.

FIG. 2 shows the relationship between optical output in the form of power and drive current of a semiconductor laser illustrating that P-I properties are temperature dependent. At a general operating temperature $T_0$ 106 the oscillation threshold current $I_{th}$ is $I_{th_0}$. However, when the temperature of the semiconductor laser increases to $T_1$, as indicated at 107, the P-I properties change requiring also a higher oscillation threshold current $I_{th_1}$. For a fixed drive current value $I_w$ at the time of recording, power of the write beam drops from $P_0$ to $P_1$ because of the temperature variation. When data recording is further attempted following such a temperature increase, recording is aggravated or the write pit length is shortened. Thus, in order to control and maintain a fixed optical output, present recording technology utilizes Automatic Power Control (APC) to monitor the optical output of the semiconductor laser using a photodiode feedback circuit.

Although it is possible to control the power of the write beam to a certain set value according to such prior art technology, it is not possible to detect whether the write power is most suitable at any point during recording, thereby making impossible control that responds to variations in the recording sensitivity of the disk resulting from temperature and other variations over time. FIG. 3 shows the relationship between regeneration pulse width and disk temperature when recording is accomplished while maintaining a fixed power for the write beam. When disk temperature rises from $T_1$ to $T_2$, recording sensitivity rises and the write pit lengths are increased so that regeneration pulse width widens from $L_1$ to $L_2$. However, the write beam power still slips away from the most desirable value and, as a result, the regeneration signal deteriorates in quality.

SUMMARY OF THE INVENTION

The present invention is one that resolves such problems of the prior art by offering an optical recording regeneration apparatus capable of recording information in an optimum manner without being affected by variations in disk recording sensitivity resulting from temperature changes and other changes over time. To this end, the present invention provides means to control power of the write beam by modulating a semiconductor laser and monitoring peak power in the disk auto-laser power control (ALPC) region.

The optical recording regeneration apparatus of this invention performs record regeneration of information comprising an optical head with an optical source, such as, a semiconductor laser, signal regeneration means for regenerating recorded pits, recording state detection means detecting the state where pits from the output of the signal regeneration means are recorded, modulation control means generating signals to control the modulation of the optical source at the time of information recording in correspondence with the recording state of the pits detected by the recording state detection means, and optical circuit drive means that drives the optical source with the output provided from the modulation control means.

The recording state detection means comprises a two-value means that transforms output of the signal regeneration means into a digital signal and a pulse width measurement means that determines the digital signal pulse width. Alternatively, the recording state detection means comprises a two-value means that transforms output of the signal regeneration means to a digital signal and a detection means that determines the duty cycle of the digital signal. In still another embodiment recording state detection means is an amplitude measurement means that measures the amplitude of the signal output of the signal regeneration means.

The modulation control means controls the power of the write beam during information recording. Alternatively, the modulation control means may control both the power and pulse width of the write beam at the time of information recording.

The regeneration signals of pits detected by the recording state detection means are signals regenerated by recording a specific pattern of pits or predetermined pit pattern in the calibration region of the optical source modulation previously furnished on the recording medium. The regeneration signals of pits detected by the recording state detection means are regeneration signals at time of data verification which is accomplished by checking to see if the information has been correctly recorded.

The state of the regeneration signals of recorded pits is measured by the recording state detection means. When optical power is determined to be excessive, the optical source drive means lowers optical power by output from the modulation control means. Conversely, when optical power is found to be low, the optical source drive means increases the write beam power controlling optical source output to optimize the recording state of thereby recorded pits so that information can be continuously recorded under the most desirable conditions for write beam power.

Other objects and attainments together with a fuller understanding of the invention will become apparent and appreciated by referring to the following description and claims taken in conjunction with the accompanying drawings.

DESCRIPTION OF THE INVENTION

Figure 1:
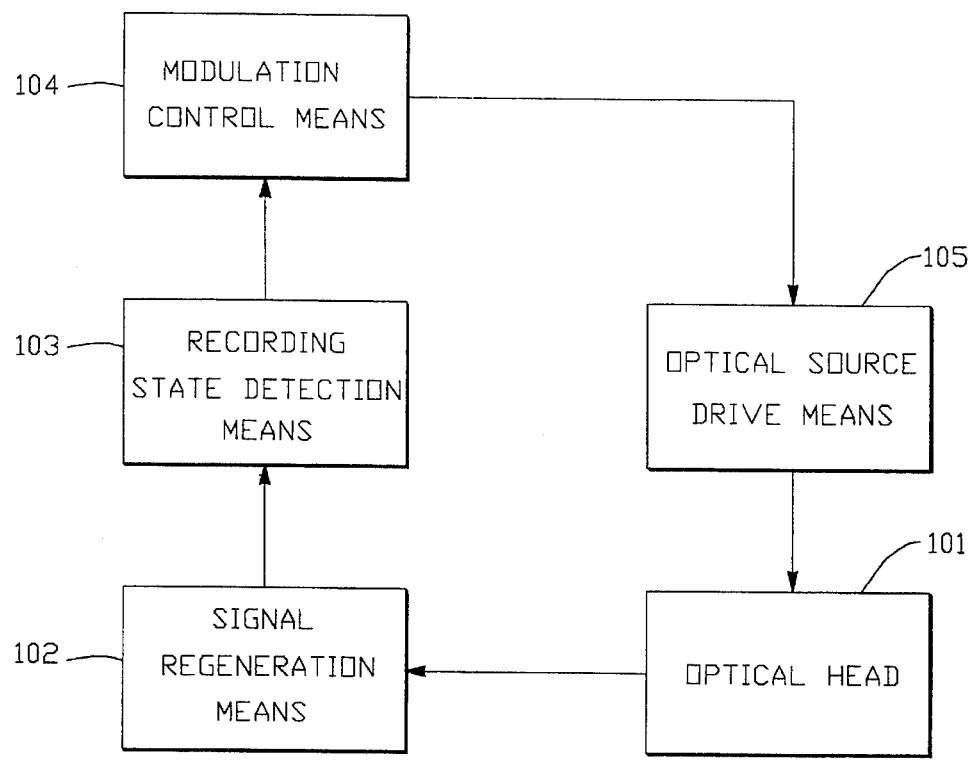
FIG. 1 is a block diagram of the optical recording regeneration apparatus of the present invention.

Referring to FIG. 1, an optical recording regeneration apparatus employs a semiconductor laser as an optical source. The type of optical disk recording utilized may be the record once type or the magnet-optical and phase change erasable type. First, the write current of optical source drive means 105 is set by modulation control means 104 so as to emit light of predetermined power. Means 105 drives a semiconductor laser in optical head 101 to record data. Following data recording, data is checked by conventional means to verify that it has been correctly written. At time of verification the state of the signal regenerated by signal regeneration means 102 is detected by recording state detection means 103. When the state of the regeneration signal is recognized as being recorded at a value where write power is lower than an optimum value, modulation control means 104 commands optical source drive means 105 so that write power is increased in response to that state and the write current of the semiconductor laser is increased. Conversely, when the regeneration signal is recognized as being recorded at a write power higher than an optimum value, a reverse operation to that previously described is implemented. By such a sequence of operations, write power is constantly controlled to maintain an optimum value.

Figure 4:
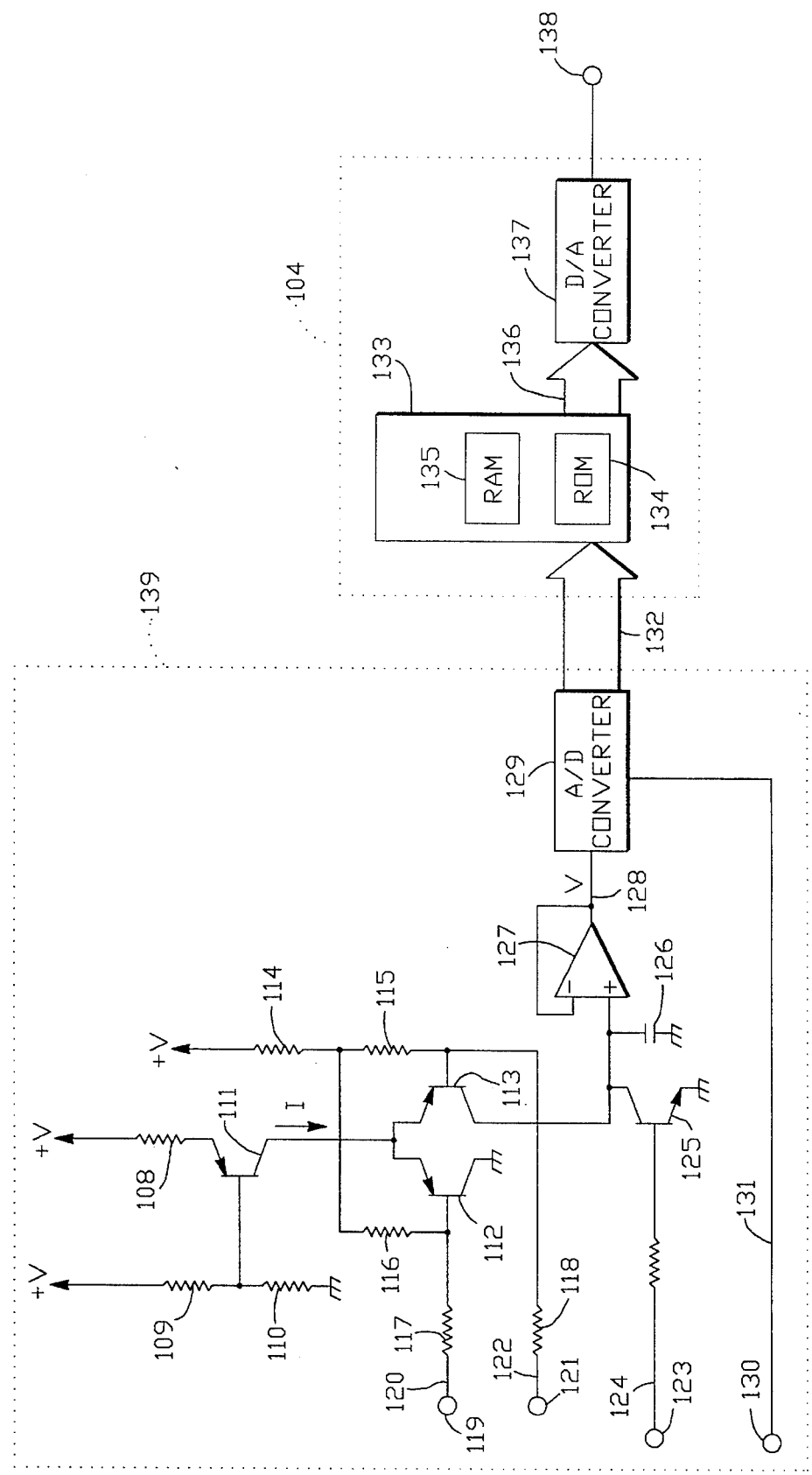
FIG. 4 is a circuit diagram of exemplary pulse width measurement means in the recording state detection means of the present invention.

FIG. 4 depicts a circuit diagram of exemplary pulse width measurement means in the recording state detection means. The pulse width measurement means 139 and modulation control means 104 are enclosed by respective dotted lines. The two-value means in the recording state detection means are accomplished employing conventional circuits such as comparators.

Considering the pulse width measurement means, a constant current source is constructed of resistors 108, 109, 110 and transistor 111. The value of the constant current I is now 1 and will be switched by transistors 112, 113. Resistors 114, 115, 116, 117, 118 impart biases to the two transistors. Signal 120, which is a digitized string of regeneration pits made by signal regeneration means 102, is input at terminal 119. Similarly, signal 122, which is a digitized string of regeneration pits, is input at terminal 121. Signal 120 will be "H" in the pit segment and "L" between pits. Signal 122 is of opposite phase. Consequently, transistor 113 turns on, transistor 112 turns off and constant current I flows to condenser 126 in the pit segments. Conversely, constant current I flows from the collector of transistor 112 to GND between pits.

Transistor 125 resets the charge stored in condenser 126. At time of "H", reset signal 124 inputted from terminal 123 causes transistor 125 to turn on for the reset operation. A buffer is constructed by op amp 127. When the voltage of buffer output 128 is V and the capacitance of condenser 126 is C, V increases while signal 120 is "H" as:

$$V = 1/C * \int I \, dt.$$

Taking the time of the pit segment as T, we obtain the value:

$$V = I * T/C.$$

Figure 5:
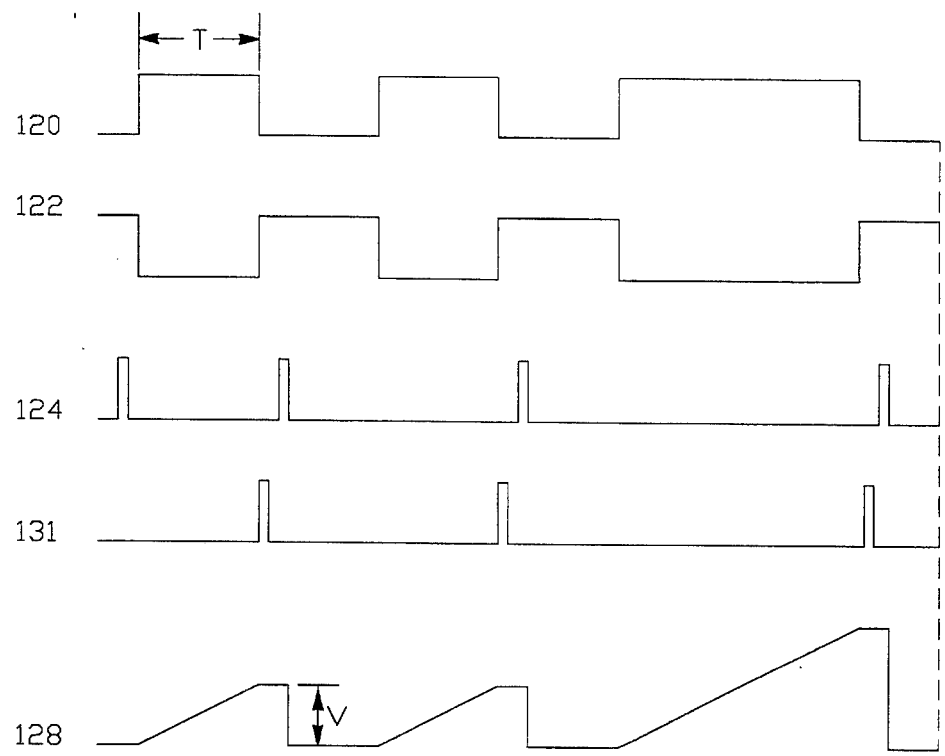
FIG. 5 depicts signal wave form diagrams at selected points of FIG. 4.

V is converted to pulse width data 132 of digital values by A/D converter 129. A/D conversion timing signal 131 is inputted at terminal 130. In this example, the A/D conversion is done by the rising-up of signal 131. FIG. 5 depicts signal wave forms at selected points in FIG. 4.

Referring to FIG. 4 and, in particular, the circuit of modulation control means 104, the operational treatment for write power control is done by CPU 133. CPU 133 is a one-chip type containing ROM 134 and RAM 135. ROM 134 contains the control program and constants. RAM 135 contains the results of operations for use as needed. CPU 133 compares a specified value against pulse width data 132 from pulse width measurement means 139. When data 132 is shorter than the specified value, data 136 outputs to D/A converter 137 and executes the D/A conversion so that the pulse current at the time of recording is increased, write power is increased and an optical power control signal is obtained from terminal 138. When data 132 is longer than the specified value, the described operations are carried out in reverse so that write power is reduced.

Figure 6:
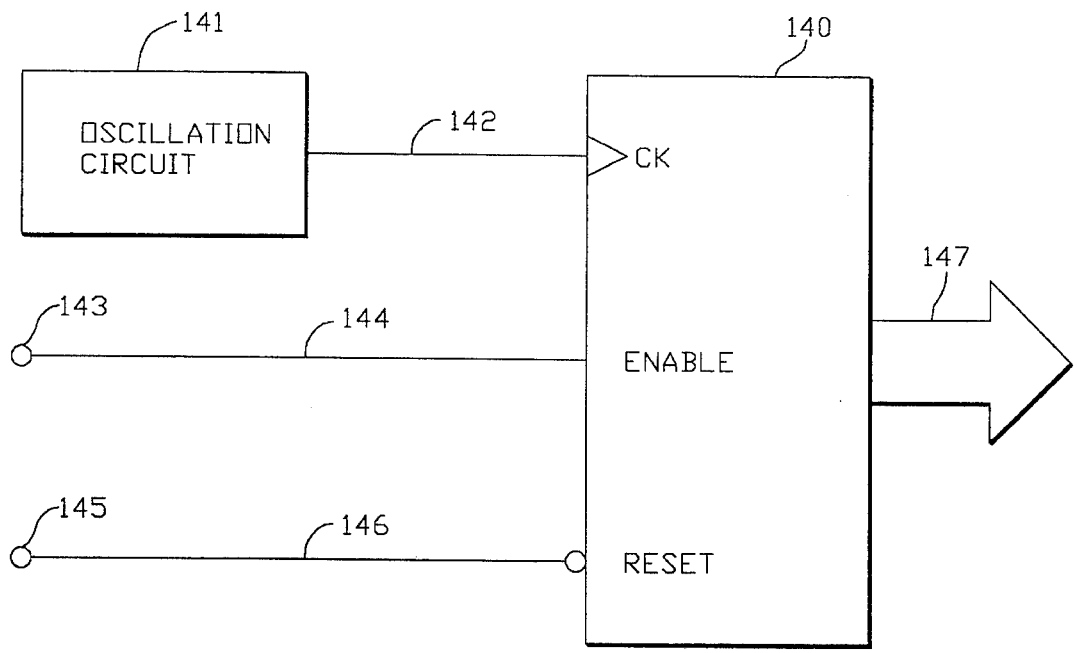
FIG. 6 is a diagram of alternative pulse width measurement means of the present invention.
Figure 2:
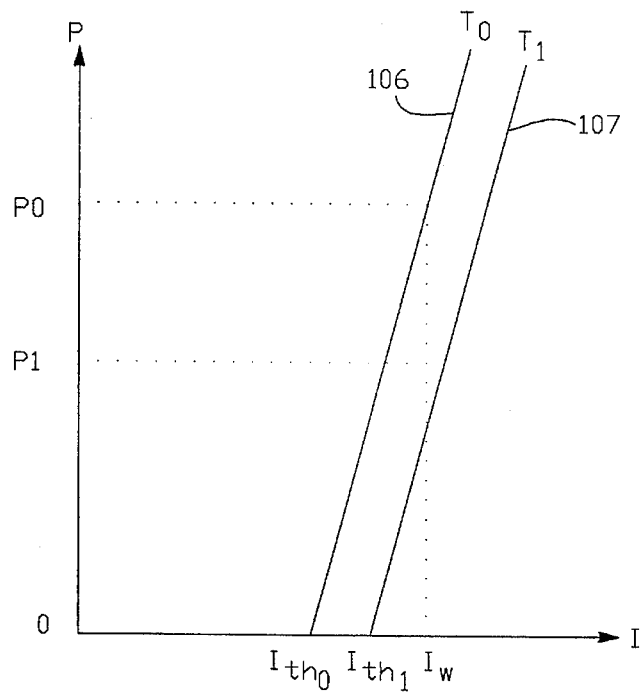
FIG. 2 is a P-I properties diagram of a semiconductor laser.
Figure 3:
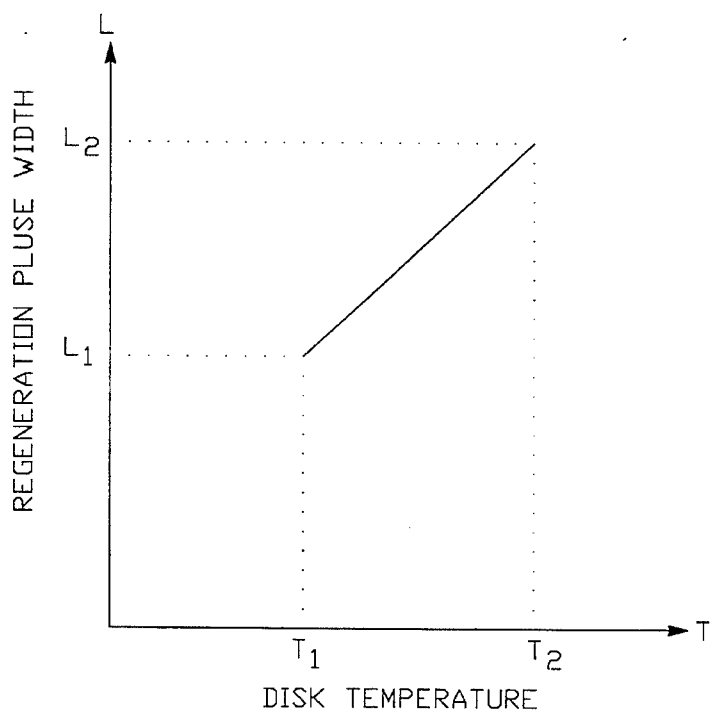
FIG. 3 is a diagram of the relation between disk temperature and regeneration signal pulse width.
Figure 7:
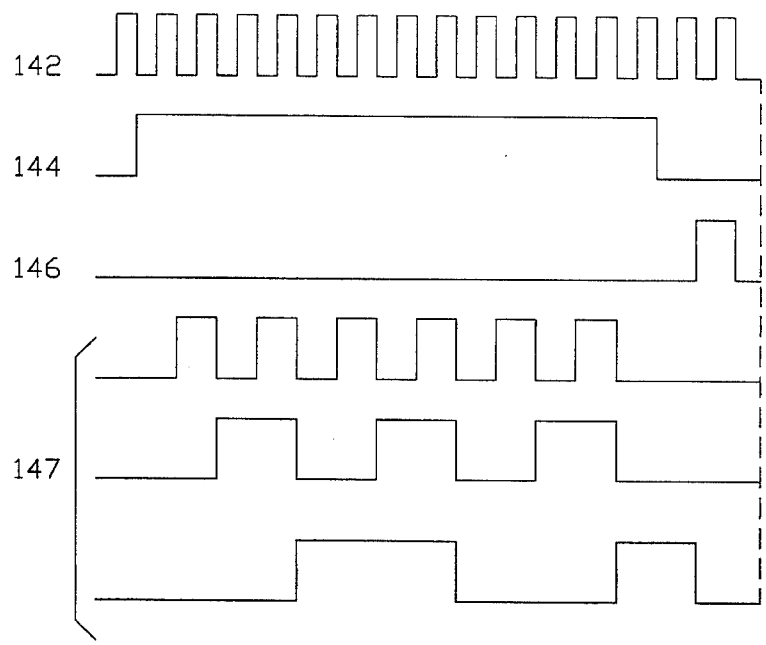
FIG. 7 depicts signal wave form diagrams at selected points of FIG. 6.

FIG. 6 depicts alternative pulse width measurement means 139. Oscillator 141 for generating clock 142 of counter 140 is preferably a crystal oscillator. Signal 144, a digitized string of regeneration pits produced by signal regeneration means 102, is input from terminal 143. This signal becomes "H" at a pit segment and counter 140 goes to an enable state between "11". Reset signal 146 of counter 140 is input from terminal 145. When this signal becomes "L", counter 140 is reset. Output signal 147 of counter 140 is pulse width measurement data. FIG. 7 depicts signal wave forms seen at designated parts of FIG. 6.

Figure 8:
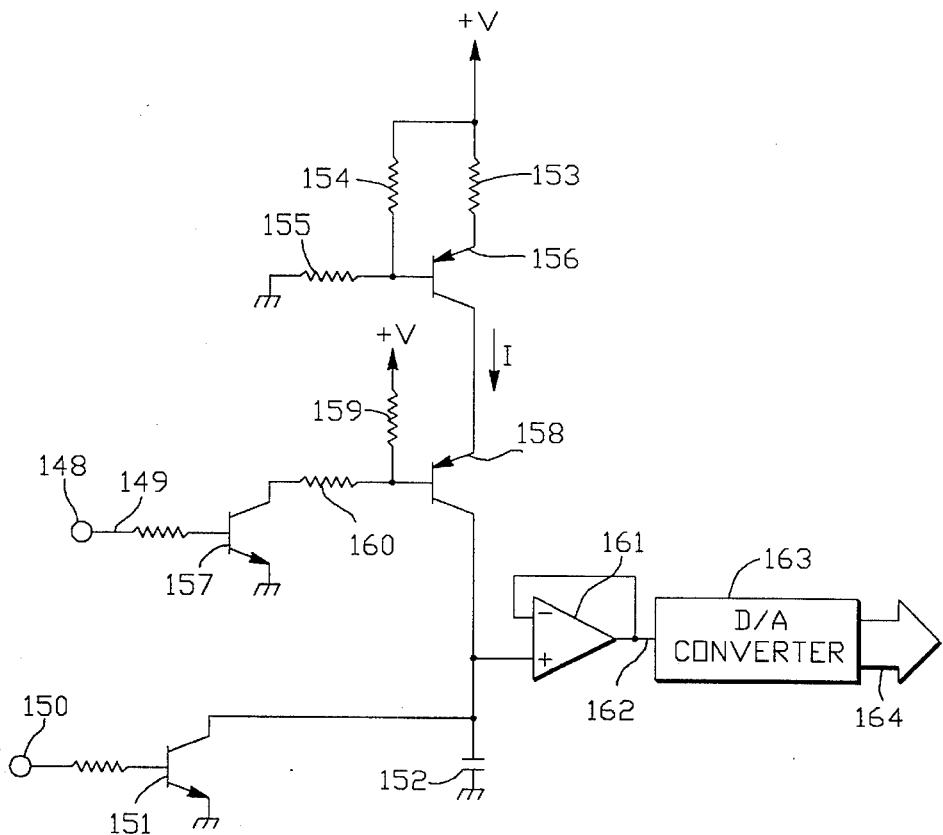
FIG. 8 is a circuit diagram of exemplary duty detection means in the recording state detection means according to an alternative embodiment of the present invention.

Referring to FIG. 8 showing the circuit diagram of the duty detection means in the recording state detection means according to an alternative embodiment of the present invention, digital signal 149 of the two-valued output of signal regeneration means 102 is input at terminal 148 and the reset signal is input at terminal 150. When the reset signal is "H", transistor 151 turns on and the charge stored in condenser 152 is discharged to the reset state. The reset signal becomes "H" only for a predetermined time before the regeneration signal state is detected. A constant current source is constructed of resistors 153, 154, 155 and transistor 156. This constant current value is now 1. When digital signal 149 is "H", transistor 157 turns on, and the base voltage of transistor 158 is a value +V divided by resistors 159 and 160. At this time current passes through transistor 158 and charges condenser 152. Op amp 161 constructs a buffer and voltage appears in output 162 having the same magnitude as the voltage across condenser 152. Taking time T when digital signal 149 is "H" and taking the voltage at output 162 as VO, VO=I * T.

When digital signal 149 is "L", transistor 157 turns off, the base of transistor 158 is fixed at +V, current I does not flow into condenser 153 and VO retains the value before "L". Output 162 is converted to digital signal 164 by D/A converter 163. The modulation control means, based on digital signal 164, increases write power when the duty ratio is low and decreases write power when it is high.

Figure 9:
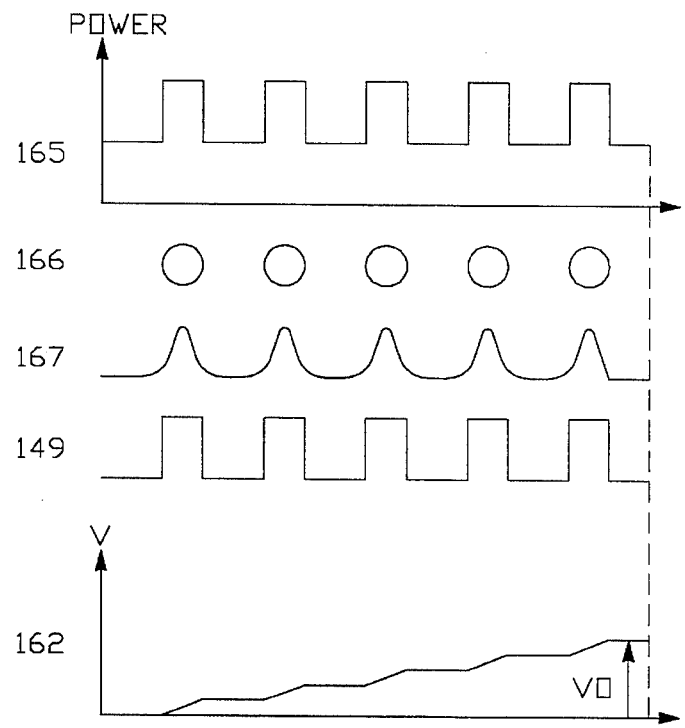
FIG. 9 depicts signal wave form diagrams at selected points of FIG. 8.

FIG. 9 depicts signal wave form diagrams of each part of FIG. 8 when write power is lower than optimum, with optical output 165 in the shortest repetitive pattern and recorded pit string 166. Regeneration signal 167 and digitized signal 149 are shown. The most suitable write power will be obtained when the duty ratio of this signal is 1:1. In FIG. 9, the duty ratio is below 50%.

Figure 10:
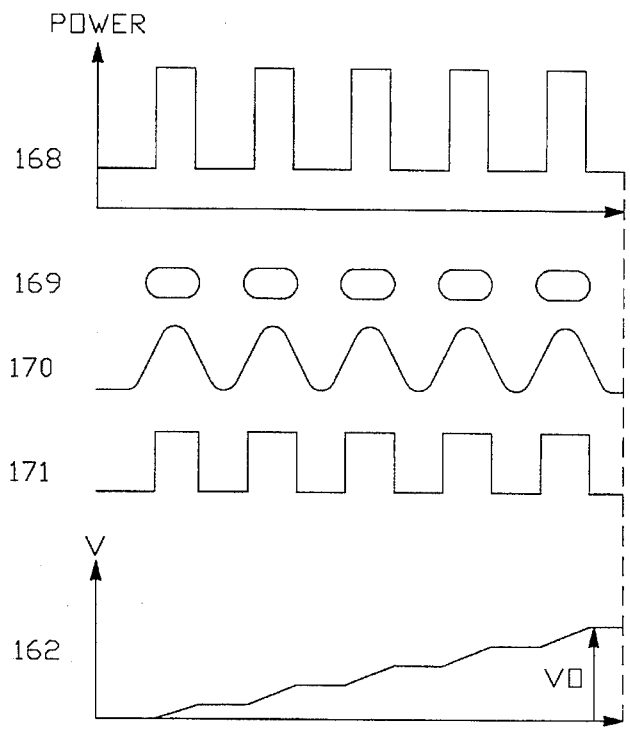
FIG. 10 depicts signal wave form diagrams at selected points of FIG. 8.

The signal wave forms of each part of FIG. 8 when write power is at the most suitable state are depicted in FIG. 10. When recording is accomplished with optical output 168, the recorded pits become as depicted in wave form 169. Regenerated pits wave form 170 and digitized signal 171 are shown. The duty ratio of signal 171 is 50% and write power is now in the most suitable state.

Figure 11:
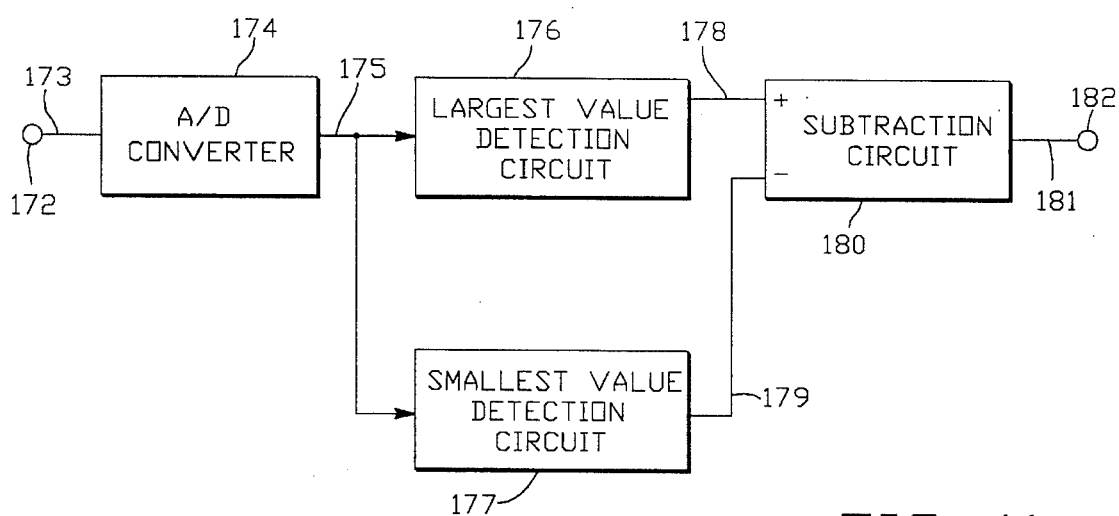
FIG. 11 is a diagram of exemplary amplitude measurement means in the recording state detection means according to still another embodiment of the present invention.

FIG. 11 depicts a diagram of exemplary amplitude measurement means in the recording state detection means according to still another embodiment of the present invention. Regeneration signal 173 input from terminal 172 is input to A/D converter 174 and converted to digital signal 175. The largest value 178 of digital signal 175 is detected by largest value detection circuit 176, and the smallest value 179 of the digital signal is detected by smallest value detection circuit 177. Amplitude data 181 is output at terminal 182 by subtracting smallest value 179 from largest value 178 with subtraction circuit 180.

Figure 12:
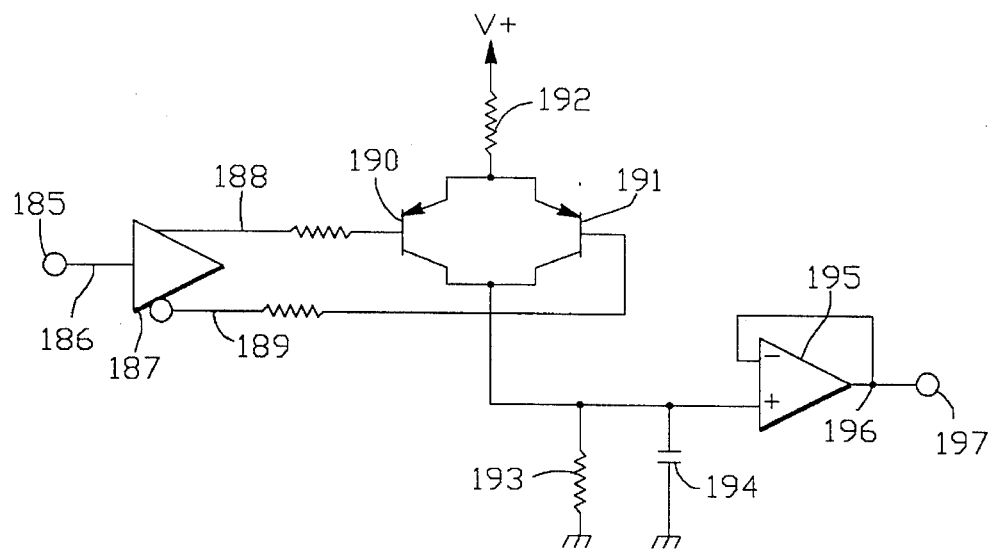
FIG. 12 is a circuit diagram of exemplary alternative amplitude measurement means according to the present invention.

FIG. 12 depicts a circuit diagram of alternative amplitude measurement means according to the present invention. Regeneration signal 186 is input at terminal 185. Amplifier 187 is shown. A signal of the same phase as output 186 is input at 188 and a signal of opposite phase is output at 189. The direct current biases of 188 and 189 are of the same potential. A full-wave rectification operation is done with transistors 190, 191 and resistors 192, 193. Condenser 194 is installed to smooth the signal after rectification. A buffer is constructed of op amp 195. Amplitude detection of regeneration signal 186 in the form of signal 196 is output from terminal 197.

Figure 13:
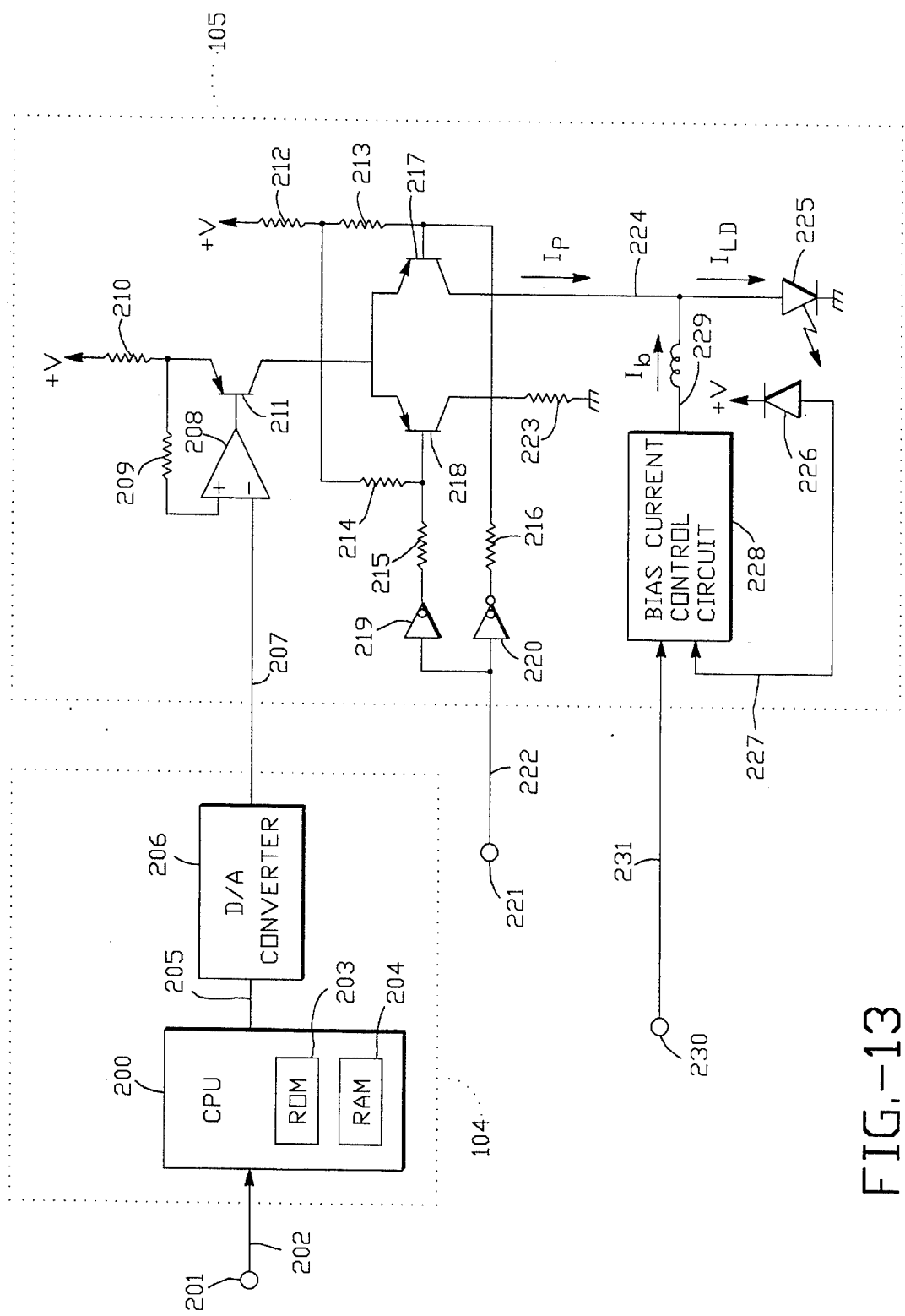
FIG. 13 is a circuit diagram of exemplary modulation control means and optical source drive means of the present invention.

Referring to FIG. 13, exemplary circuit diagrams of modulation control means 104 and optical source drive means 105 are shown. Modulation control is accomplished by CPU 200. In this example, CPU 200 is of one-chip type containing ROM 203 and RAM 204. The control program and constant are in ROM 203, and the several measurement values and set values are stored in RAM 204. Signal 202 identifying the recording state of the pits is sent from the recording state detection means to terminal 201. CPU 200 provides digital data 205, corresponding to the recording state for controlling write power to D/A converter 206, to set the pulse current of the semiconductor laser at recording time.

Optical source drive means 105 drives the semiconductor laser current. Current $I_{1d}$ to semiconductor laser 225 comprises bias current $I_b$ of signal 229 and current $I_p$ of pulse 224. Optical source drive means segments to control bias current $I_b$ of 229 and pulse current $I_p$ of 224.

The optical output of semiconductor laser 225 is detected by monitor photodiode 226. At time of signal regeneration, bias current control circuit 228 controls current $I_b$ so that the value of monitor signal 227 is constant. During recording, current $I_b$ is held at the value immediately before recording by control signal 231 input from terminal 230. Referring to the pulse current drive circuit, a constant current source that determines pulse current $I_p$ is constructed of resistors 209, 210, transistor 211 and op amp 208. The value of the current is determined by output signal 207 of D/A converter 206 of modulation control means 104. Transistors 217 and 218 switch the current, and resistors 212, 213, 214, 215 and 216 impart biases to transistors 217, 218. Write pulse data 222 is input from terminal 221. TTL 74L507 219 is an open collector type buffer, and TTL 74LS06 220 is an open collector type inverter.

When write pulse data 222 is "L", transistor 218 is on, transistor 217 is off and pulse current $I_p$ flows to resistor 223 without flowing to semiconductor laser 225. When write pulse data 222 is "H", transistor 218 is off, transistor 217 is on, $I_p$ flows into semiconductor laser 225 and drive current $I_{1d}$ of semiconductor laser 225 assumes a value according to the relationship: $I_{1d}=I_b+I_p$.

Figure 14:
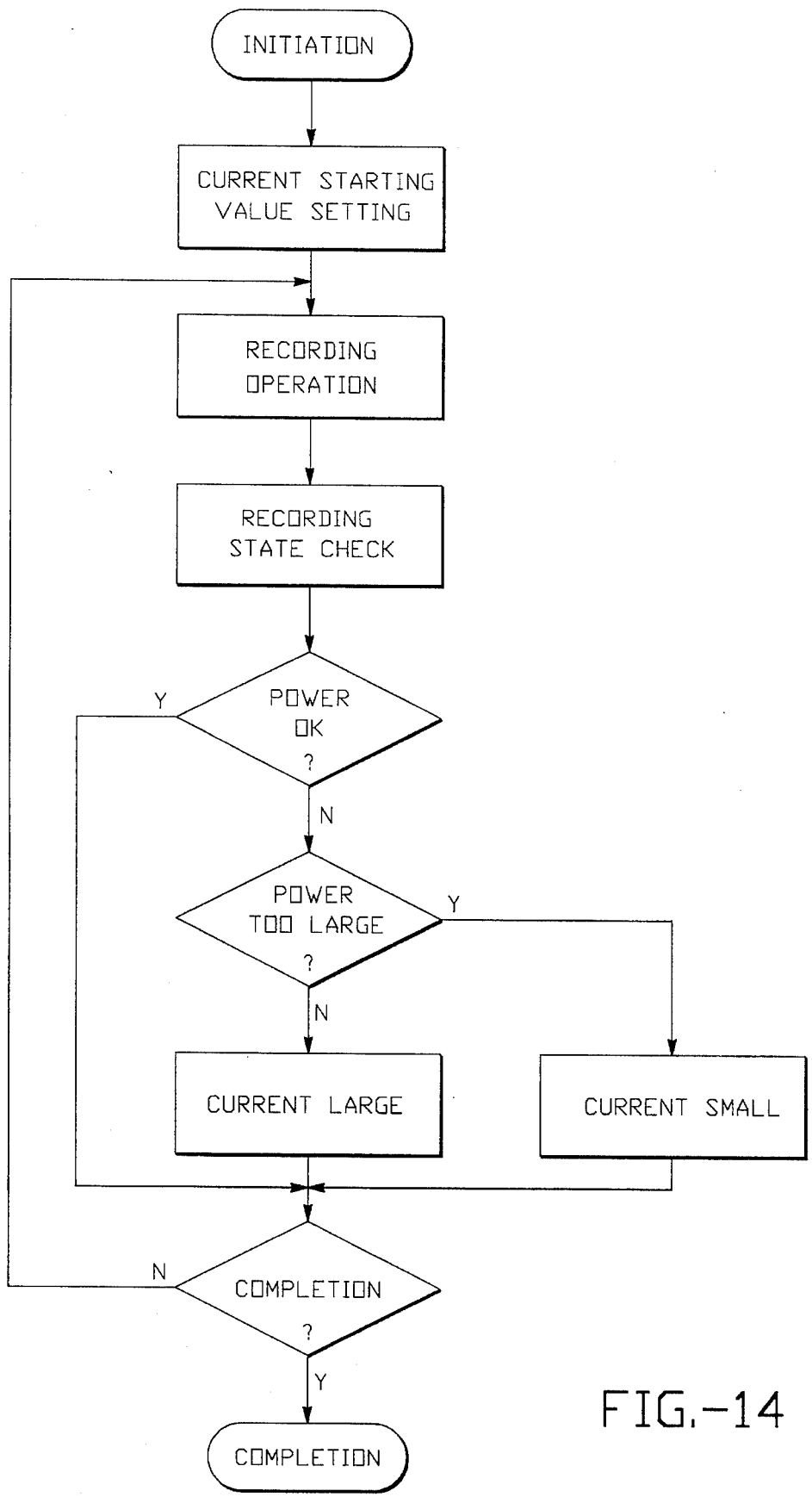
FIG. 14 depicts the flow of control of the modulation control means of FIG. 13.

FIG. 14 is a flowchart depicting the flow of control of the modulation control means of FIG. 13. The control method steps include: 1. initiation; 2. setting pulse current to a starting value written in ROM; 3. initiating the recording operation; 4. checking the recording state of the pits by the recording state detection means; 5. determining whether the write power is satisfactory and, if so, maintaining the pulse current value and, if not, determining whether the write power is too large or too small; 6. when the write power is too large, the pulse current is decreased, and when it is too small, the pulse current is increased, with the proportion of increased or decreased current determined according to the amount of slippage of the write power from an optimum value; 7. deciding whether the control is completed or not; 8. if not completed, the recording operation is done a second time and, if completed, control is terminated.

Figure 15:
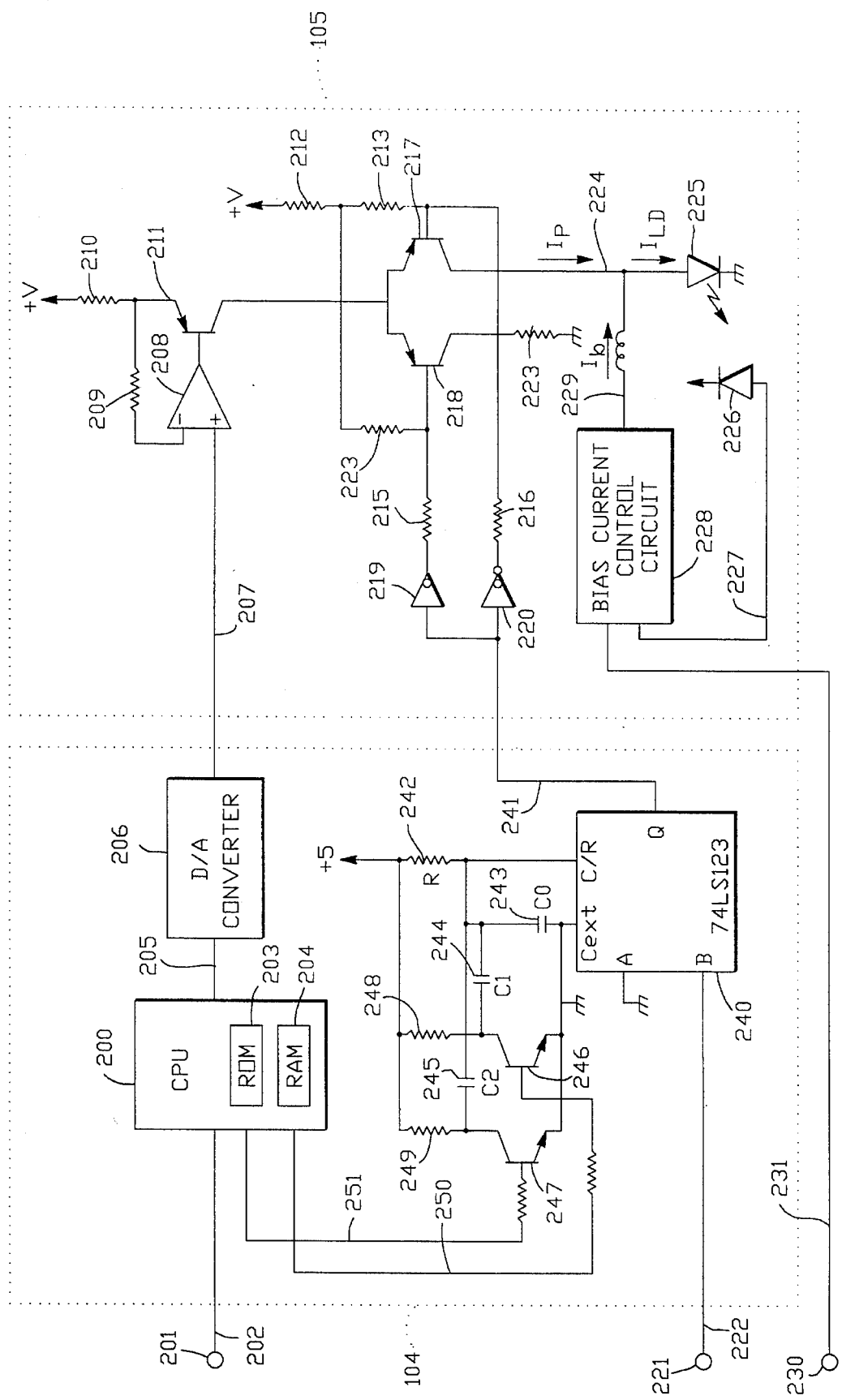
FIG. 15 is a circuit diagram of exemplary modulation control means and optical source drive means according to an alternative embodiment of the present invention.

FIG. 15 depicts a circuit diagram of exemplary modulation control means according to an alternative embodiment of the present invention for controlling write power and pulse width at time of information recording, along with optical source drive means 105. Reference numerals corresponding to those in FIG. 13 represent identical elements. The invention comprises modulation control means circuit 104 and optical source drive means circuit 105. CPU 200 is a one-chip type containing ROM 203 and RAM 204. The control program and constant are in ROM 203, and each measurement value and the data for write power and pulse width setting are stored in RAM 204 for use as necessary. CPU 200 transmits digital data 205 for controlling write power to D/A converter 206, and sets pulse current $I_p$ that drives the semiconductor laser at the time of recording.

With regard to pulse width control, monostable multivibrator 240 employs a TTL 74LS123. Write pulse 241 of fixed time width T is output by the leading-edge of write data 222 input from terminal 221. Here, the value of resistor 242 is taken as R, the value of condenser 243 as $C_0$, the value of condenser 244 as $C_1$ and the value of condenser 245 as $C_2$. Write pulse width T is determined as shown in the following formula by R and the capacity $C_t$ between $C_{ext}$ and the CIR terminal.

$$T = a * R * C_t \text{ (a is a constant)}$$

By changing the value of Ct it is possible to control write pulse width T. Transistors 246 and 247 serve as switches and make a composite capacity of $C_0$, $C_1$ and $C_2$. Resistors 248, 249 impart transistor bias currents. When control signal 250 from CPU 200 becomes "H", transistor 246 goes on. Similarly, when control signal 251 is "H", transistor 247 goes on. The relationship between Cext and control signals 250 and 251 is as follows:

| 250 | 251 | $C_{ext}$ |
|---|---|---|
| on | on | $C_0 + C_1 + C_2$ |
| on | off | $C_0 + C_1$ |
| off | on | $C_0 + C_2$ |
| off | off | $C_0$ |

Although switching of write pulse width T is accomplished in four stages according to this example, the value of pulse width T may be controlled in more than four multistages if the number of control signals, condensers and transistors are increased. To maintain the optimum recording state, CPU 200 changes write power and pulse width in response to recording state detection means signal 202 representing the recording state sent from the recording state detection means input in terminal 201 to control for maintaining the optimum recording state.

Figure 16:
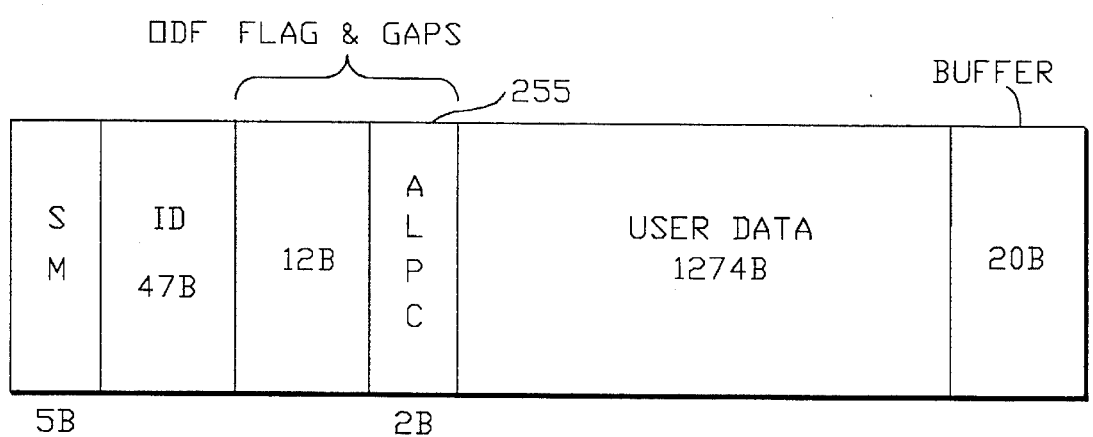
FIG. 16 is a sector format diagram of an optical disk according to the present invention.

FIG. 16 depicts the sector format of an optical disk having a format of 1,360 bytes per sector. The first five bytes are sector marks SM which identify the beginning of the sector. The next 47 bytes are an ID region where the track address and sector address are written. The next 14 bytes comprise an ODF flag and gaps region. The last two bytes are ALPC region 255 which is furnished for calibration of the optical output of the semiconductor laser and can be freely used without stipulation as to the method of use.

The optical recording regeneration apparatus of the present invention drives the semiconductor laser in the ALPC region with a write pulse of a specified pattern, detects the recording state from the regeneration signals of the recorded pits, and controls optical output of the semiconductor laser so as to provide an optimum recording state.

Figure 17:
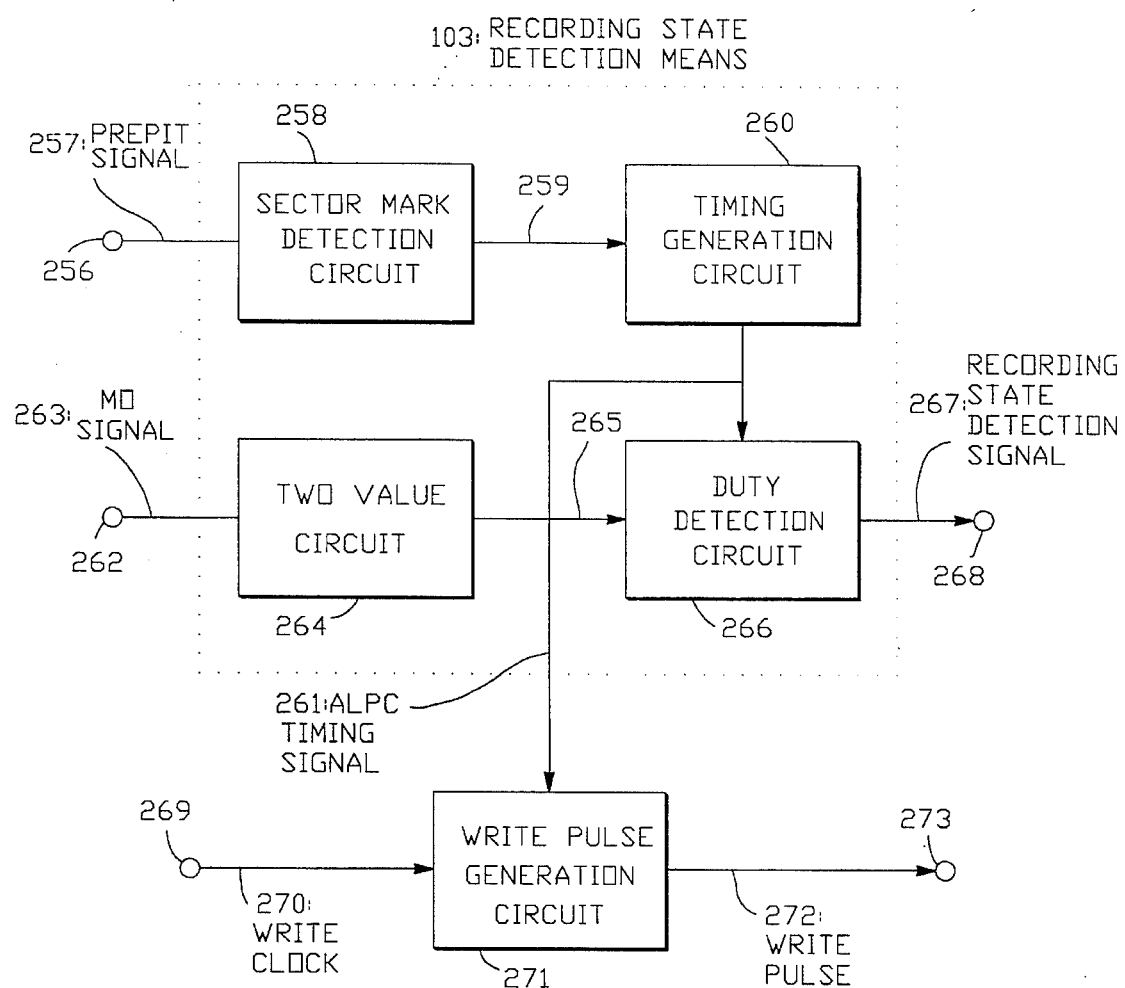
FIG. 17 is a circuit diagram of exemplary optical pulse generation means and recording state detection means of the present invention.

FIG. 17 depicts exemplary recording state detection means 103 and write pulse formation means. Prepit signal 257 of regenerated prepits from terminal 256 is inputted to sector mark detection circuit 258 and sector mark 259 is detected. Based on sector mark 259, timing generation circuit 260 generates ALPC timing signal 261. At terminal 262 MO signal 263 is input to two-value circuit 264 to generate digital data 265. Duty detection circuit 266 measures the duty ratio of digital data 265 while ALPC timing signal 261 is active and outputs recording state detection signal 267 to terminal 268.

Figure 18:
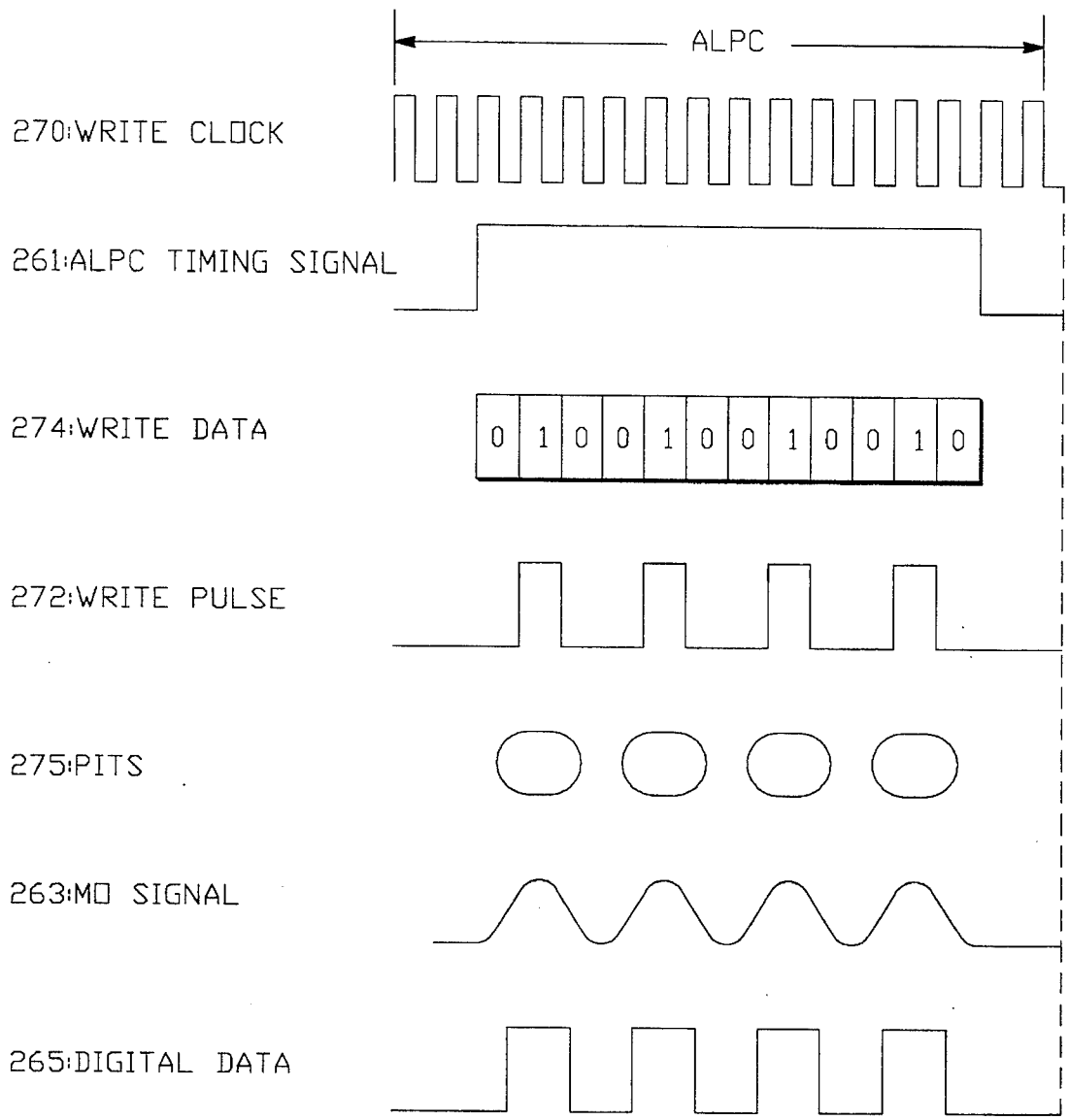
FIG. 18 depicts signal wave form diagrams at selected points of FIG. 17.

With regard to the generation of the write pulse for recording a specific pattern in the ALPC area, a write clock 270 from terminal 269 is input to write pulse generation circuit 271. While ALPC timing signal 261 is active, write pulse generation circuit 271 generates write pulse 272 and outputs to terminal 273. FIG. 18 depicts signal wave form diagrams at selected points of FIG. 17. In the present example, ALPC timing signal 261 becomes active in the ALPC 2-byte region except for two pits at the front and back of the region for timing generation circuit precision and absorbing disk rotation unevenness. The pattern of write data 274 repeats "010" in the shortest repetitive pattern of 2–7 modulation data. The write pulse 272 is also shown. The duty ratio of digital data 265 is a two-value data of signal 263 from regenerating pits 275 recorded with such pattern and has optimum recording state at 50%. In this example the pits are recorded in fours.

Figure 19:
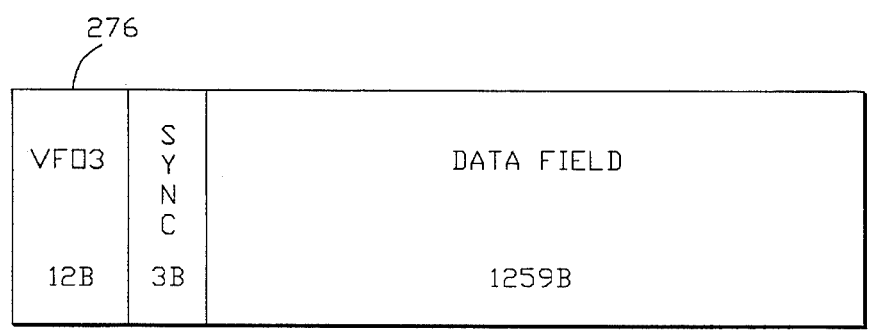
FIG. 19 is a format diagram of an exemplary user data region of an optical disk according to the present invention.

In an exemplary optical recording regeneration apparatus, the circuit construction is the same as in FIG. 17. Referring to FIG. 19 depicting the format diagram of the user data region of an optical disk, twelve lead bytes 276 comprise the region designated VFO3. When 2–7 modulation is used, the channel pit pattern of VFO3 is the shortest repetition pattern "010010010010010 . . . 010010". By employing the duty detection means of the present invention relative to all or part of this pattern, the write power of the semiconductor laser is controlled so that the duty is 50%.

Because the pit length is unitary, it is possible to measure the time width of a pit not only in the VFO3 region but anywhere in the user zone with a pit position detection method. In the case of a pit edge recording method, either a part or all of the pit time can be measured relative to the VFO3 pattern where the time width is predetermined. Further, because it is preferred to have discrete values in a pattern of 2 zeros to 7 zeros from "1001" to "100000001" in the data, it is possible to classify and recognize these patterns and measure pit widths in terms of certain specified pit lengths. It does not matter if measurements are made of time widths for all pits or for any number of patterns.

The apparatus according to the present invention is superior from the standpoint of disk interchangeability because optimization of write power is done automatically by the apparatus itself, even with disks of differing recording sensitivities.

The present invention provides optimum write power in correspondence with recording sensitivity changes resulting from disk temperature changes or other changes over time. The pit edge recording method increases memory capacity with standard formats. Such method requires precise control over write power for strict management of the pit width being recorded. When the optical recording regeneration apparatus of the present invention is employed in combination with pit edge recording, particularly superb results are obtained.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical recording regeneration apparatus for recording data on a recording medium having a plurality of tracks spaced apart in a radial direction of the medium, each track including a plurality of sectors with each sector having a data region and a calibration region, the apparatus comprising:

optical means for providing a laser beam for recording a test pattern of data in a calibration region of a sector on a track on the medium for initial calibration and for recording a data pattern in a data region of the sector on the track on the medium;

signal regeneration means for reading out data patterns from the medium, said signal regeneration means reading out the test pattern from the calibration region and the data pattern from the data region of the sector on the track;

recording state detection means, responsive to said signal regeneration means, for detecting the recording state of the test pattern and the data pattern read out by said signal regeneration means and for generating state data indicative of the corresponding recording state, said recording state detection means detecting the recording state of the data pattern read out from the data region at the time when the data pattern is being verified and generating associated state data;

modulation control means, responsive to said recording state detection means, for controlling the power level of the laser beam, said modulation control means including comparison means for comparing the state data generated by said recording state detection means with specified values and providing comparison results; and drive means, responsive to said modulation control means, for driving said optical means, for adjusting the power level of the laser beam in accordance with the comparison results associated with the state data of the test pattern in the calibration region for initial recording and for adjusting the power level of the laser beam in accordance with the comparison results associated with the state data of the data pattern in the data region so as to maintain the power level of the laser beam at an optimum value for subsequent recording.

2. The apparatus of claim 1 wherein said recording state detection means includes:

two-value means for transforming the output of said signal regeneration means to a digital value; and pulse width measurement means for measuring the pulse width of the digital signal and for generating measured pulse width as the state data.

3. The apparatus of claim 1 wherein said recording state detection means includes:

two-value means for transforming the output of said signal regeneration means to a digital signal; and duty ratio detection means for detecting the duty ratio of the digital signal and for generating detected duty ratio as the state data.

4. The apparatus of claim 1 wherein said recording state detection means includes:

amplitude measurement means for measuring the amplitude of the output of said signal regeneration means and for generating measured amplitude as the state data.

5. An optical recording regeneration apparatus for recording data on a recording medium having a plurality of tracks spaced apart in a radial direction of the medium, each track including a plurality of sectors with each sector having a data region and a calibration region, the apparatus comprising:

optical means for providing a laser beam for recording a test pattern of data in a calibration region of a sector on a track on the medium for initial calibration and for recording a data pattern in a data region of the sector on the track on the medium;

signal regeneration means for reading out data patterns from the medium, said signal regeneration means reading out the test pattern from the calibration region and the data pattern from the data region of the sector on the track;

recording state detection means, responsive to said signal regeneration means, for detecting the recording state of the test pattern and the data pattern read out by said signal regeneration means and for generating state data indicative of the corresponding recording state, said recording state detection means detecting the recording state of the data pattern read out from the data region at the time when the data pattern is being verified and generating associated state data;

modulation control means, responsive to said recording state detection means, for controlling the power level and the pulse width of the laser beam, said modulation control means including comparison means for comparing the state data generated by said recording state detection means with specified values and providing comparison results; and drive means, responsive to said modulation control means, for driving said optical means, for adjusting the power level and the pulse width of the laser beam in accordance with the comparison results associated with the state data of the test pattern in the calibration region for initial recording and for adjusting the power level and the pulse width of the laser beam in accordance with the comparison results associated with the state data of the data pattern in the data region so as to maintain the power level and the pulse width of the laser beam at optimum values for subsequent recording.

6. The apparatus of claim 5 wherein said recording state detection means includes:

two-value means for transforming the output of said signal regeneration means to a digital value; and pulse width measurement means for measuring the pulse width of the digital signal and for generating measured pulse width as the state data.

7. The apparatus of claim 5 wherein said recording state detection means includes:

two-value means for transforming the output of said signal regeneration means to a digital signal; and duty ratio detection means for detecting the duty ratio of the digital signal and for generating detected duty ratio as the state data.

8. The apparatus of claim 5 wherein said recording state detection means includes:

amplitude measurement means for measuring the amplitude of the output of said signal regeneration means and for generating measured amplitude as the state data.

9. A method for recording data on a recording medium having a plurality of tracks spaced apart in a radial direction of the medium, each track including a plurality of sectors with each sector having a data region and a calibration region, the method comprising the steps of:

recording a test pattern of data in a calibration region of a sector on a track of the medium using a laser beam;

detecting the recording state of the test pattern in the calibration region of the sector to generate state data indicative of the recording state;

adjusting the power level of the laser beam in accordance with the state data of the test pattern to provide an adjusted laser beam;

recording data pattern in a data region of the sector using the adjusted laser beam;

detecting the recording state of the data pattern in the data region of the sector to generate associated state data; and adjusting the power level of the adjusted laser beam in accordance with the associated state data of the data pattern to provide a finely adjusted laser beam for subsequent data recording in another sector of the medium.

10. The method of claim 9, further comprising, after the step of recording the data pattern in the data region, a step of reading out the data pattern from the data region for data verification and a step of verifying the data pattern.

11. The method of claim 10, wherein the step of detecting the recording state of the data pattern in the data region and the step of verifying the data pattern are concurrently performed.

12. The method of claim 11 wherein the step of detecting the recording state of the data pattern in the data region includes detecting at least a part of the pits of the shortest repetition pattern designated as VFO3 in the data region at the time of data verification.

13. The method of claim 12, further comprising, after the step of recording the data pattern in the data region of the sector on said another track, a step of reading out the data pattern from the data region of the sector on said another track for data verification and a step of verifying the data pattern in the data region of the sector on said another track.

14. The method of claim 13 wherein the step of detecting the recording state of the data pattern in the data region of the sector on said another track and the step of verifying the data pattern in the data region of the sector on said another track are concurrently performed.

15. The method of claim 14 wherein the step of detecting the recording state of the data pattern in the data region includes detecting at least a part of the pits of the shortest repetition pattern designated as VFO3 in the data region at the time of data verification.

16. The method of claim 11, wherein the step of detecting the recording state of the data pattern in the data region includes detecting all of the pits of the shortest repetition pattern designated as VFO3 in the data region at the time of data verification.

17. The method of claim 11, wherein the steps of recording the test pattern and the data pattern are performed by using a pit edge recording method, and the step of detecting the recording state of the data pattern in the data region includes detecting the pit widths against specified pit lengths in the data region at the time of data verification.

18. The method of claim 9, further comprising:

recording a test pattern of data in a calibration region of a sector on another track of the medium using the finely adjusted laser beam;

detecting the recording state of the test pattern in the calibration region of the sector on said another track to generate state data indicative of the recording state;

adjusting the power level of the finely adjusted laser beam in accordance with the state data of the test pattern in the calibration region of the sector on said another track to provide a more finely adjusted laser beam;

recording a data pattern in a data region of the sector on said another track using the more finely adjusted laser beam;

detecting the recording state of the data pattern in the data region of the sector on said another track to generate associated state data; and adjusting the power level of the more finely adjusted laser beam in accordance with the associated state data of the data pattern in the data region of the sector on said another track to provide an optimum laser beam for subsequent data recording in another sector of the medium.

19. A method for recording data on a recording medium having a plurality of tracks spaced apart in a radial direction of the medium, each track including a plurality of sectors with each sector having a data region and a calibration region, the method comprising the steps of:

recording a test pattern of data in a calibration region of a sector on a track of the medium using a laser beam;

detecting the recording state of the test pattern in the calibration region of the sector to generate state data indicative of the recording state;

adjusting the power level and the pulse width of the laser beam in accordance with the state data of the test pattern to provide an adjusted laser beam;

recording data pattern in a data region of the sector using the adjusted laser beam;

detecting the recording state of the data pattern in the data region of the sector to generate associated state data; and adjusting the power level and the pulse width of the adjusted laser beam in accordance with the associated state data of the data pattern to provide a finely adjusted laser beam for subsequent data recording in another sector of the medium.

20. The method of claim 19, further comprising, after the step of recording the data pattern in the data region, a step of reading out the data pattern from the data region for data verification and a step of verifying the data pattern.

21. The method of claim 20, wherein the step of detecting the recording state of the data pattern in the data region and the step of verifying the data pattern are concurrently performed.

22. The method of claim 21, wherein the step of detecting the recording state of the data pattern in the data region includes detecting at least a part of the pits of the shortest repetition pattern designated as VFO3 in the data region at the time of data verification.

23. The method of claim 22, further comprising, after the step of recording the data pattern in the data region of the sector on said another track, a step of reading out the data pattern from the data region of the sector on said another track for data verification and a step of verifying the data pattern in the data region of the sector on said another track.

24. The method of claim 23 wherein the step of detecting the recording state of the data pattern in the data region of the sector on said another track and the step of verifying the data pattern in the data region of the sector on said another track are concurrently performed.

25. The method of claim 24 wherein the step of detecting the recording state of the data pattern in the data region includes detecting at least a part of the pits of the shortest repetition pattern designated as VFO3 in the data region at the time of data verification.

26. The method of claim 21, wherein the step of detecting the recording state of the data pattern in the data region includes detecting all of the pits of the shortest repetition pattern designated as VFO3 in the data region at the time of data verification.

27. The method of claim 21, wherein the steps of recording the test pattern and the data pattern are performed by using a pit edge recording method, and the step of detecting the recording state of the data pattern in the data region includes detecting the pit widths against specified pit lengths in the data region at the time of data verification.

28. The method of claim 19 further comprising:

recording a test pattern of data in a calibration region of a sector on another track of the medium using the finely adjusted laser beam;

detecting the recording state of the test pattern in the calibration region of the sector on said another track to generate state data indicative of the recording state;

adjusting the power level and the pulse width of the finely adjusted laser beam in accordance with the state data of the test pattern in the calibration region of the sector on said another track to provide a more finely adjusted laser beam;

recording a data pattern in a data region of the sector on said another track using the more finely adjusted laser beam;

detecting the recording state of the data pattern in the data region of the sector on said another track to generate associated state data; and adjusting the power level and the pulse width of the more finely adjusted laser beam in accordance with the associated state data of the data pattern in the data region of the sector on said another track to provide an optimum laser beam for subsequent data recording in another sector of the medium.

* * * * *